Feb. 21, 1967     J. L. ZIMMERER     3,305,279
ROLLER BEARING CAGE
Filed Dec. 21, 1964
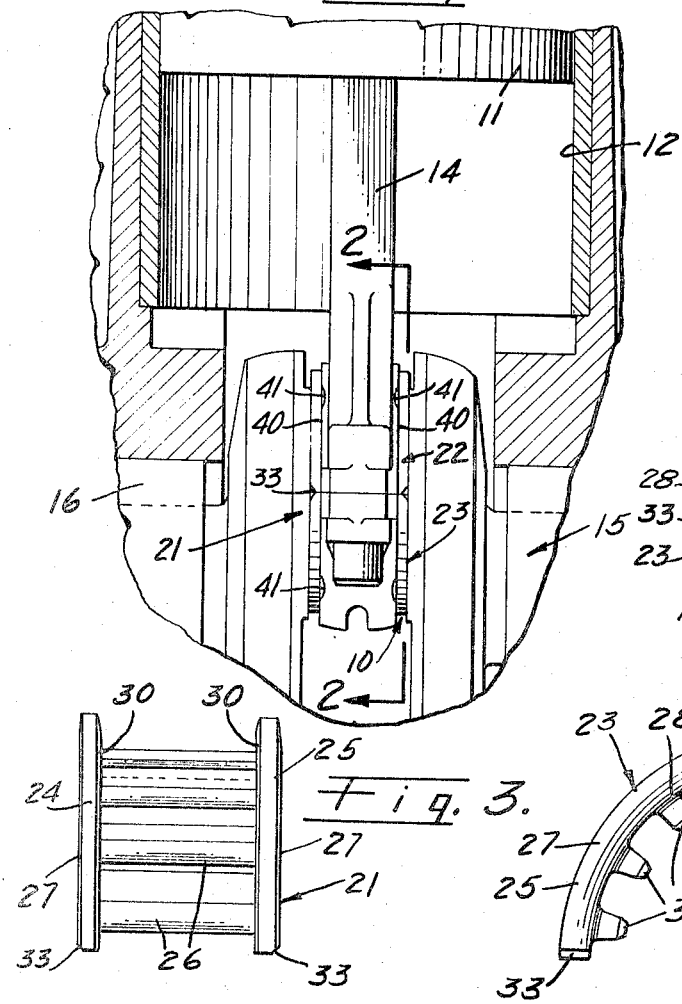
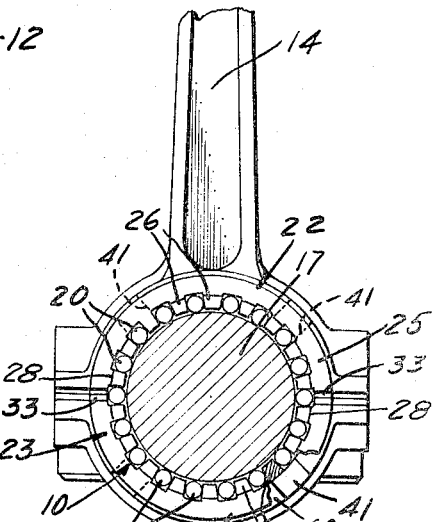
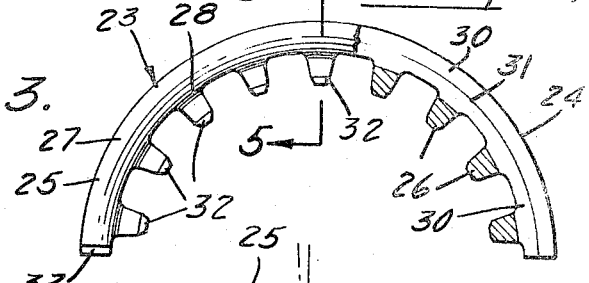
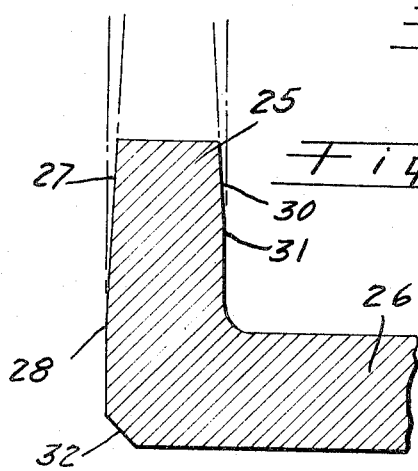
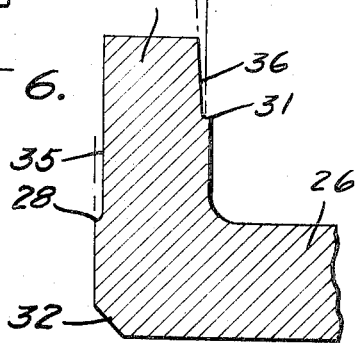
John L. Zimmerer,
INVENTOR.
WHANN & McMANIGAL
Attorneys for Applicant

# United States Patent Office 3,305,279
Patented Feb. 21, 1967

3,305,279
ROLLER BEARING CAGE
John L. Zimmerer, Torrance, Calif., assignor to McCulloch Corporation, Los Angeles, Calif., a corporation of Wisconsin
Filed Dec. 21, 1964, Ser. No. 419,682
7 Claims. (Cl. 308—35)

This invention relates generally to bearing cages for roller bearings, and particularly relates to the type of cage which is split and which consists of two spaced flanges interconnected by axially extending rods or bars.

It has been found that conventional split bearing cages for cylindrical rollers or needles fail in particular environments. Thus when the bearing cages are used for the connecting rods of internal combustion engines it was found that the cage bars and flanges frequently break due to side thrust developing between the faces of the connecting rods, the flanges of the cage and the crank pin. As a result of such side thrusts the oil between the contacting faces eventually breaks down and deteriorates. This in turn causes the flanges to overheat, resulting in seizure and eventual breakage of the bearing cage.

It is accordingly an object of the present invention to provide a roller bearing cage which provides more complete lubrication of the bearing assembly.

Another object of the present invention is to provide a roller or needle bearing cage of the split type, which will run at much lower temperature than conventional bearings, thereby prolonging the life of the bearing assembly.

A further object of the invention is to provide a roller bearing cage providing improved lubrication of the entire bearing assembly and which reduces the moment arm at the inner faces of the flange to that of the faces of the rods or bars, so that the pitch circle of the bearing needles or rollers is substantially equal to the moment arm at the inner flanges of the bearing cage.

The bearing cage of the invention serves the usual purpose of separating and guiding cylindrical rollers. The cage itself comprises two annular flanges spaced apart from each other and a plurality of axially extending cage bars, each pair being spaced apart to receive a cylindrical roller resting on the annular flanges. A bearing cage of this type is conventional and may be of the split type.

In accordance with the present invention the entire outer faces of the flanges are relieved. This may be done for example by providing a taper which extends to the line where the flange joins the bar. In addition at least a portion of the inner opposed faces of the flanges are likewise relieved, such as by tapering, or in some other manner. As a result the bearing cake may be used in such a manner that the flanges are disposed between spaced apart parallel members. For example, the bearing may be used between the connecting rod and crank pin of an internal combustion engine. Accordingly the outer faces of the bearing cage bear against the crang assembly while the inner faces bear against the connecting rod. Consequently any lateral thrust which may exist is taken up by the ears and not by the outer flanges. In addition oil is permitted to circulate between the outer faces and inner faces of the flanges and the crank assembly and connecting rod.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is an elevational view partly in section illustrating a bearing cage in accordance with the invention as utilized, for example, between the connecting rod and crank pin of an internal combustion engine;

FIG. 2 is a sectional view on an enlarged scale taken on line 2—2 of FIG. 1 and illustrating particularly the bearing assembly and the connecting rod;

FIG. 3 is a side elevational view of the bearing cage;

FIG. 4 is a front elevational view of one of the split members of the bearing cage, parts being broken away;

FIG. 5 is a sectional view on an enlarged scale through a flange and bar of the bearing cage and taken along line 5—5 of FIG. 4; and FIG. 6 is a sectional view similar to that of FIG. 5 of a modification of the bearing cage of the invention.

Referring now to the drawings, and particularly to FIGS. 1 and 2, there is illustrated a bearing assembly 10 embodying the present invention as utilized in a typical environment, such as in connection with an internal combustion engine. Thus there is illustrated a piston 11 adapted to reciprocate in a cylinder 12 and coupled to a connecting rod 14 for transmitting motion to a crankshaft generally indicated at 15. This internal combustion engine preferably is of the two-cycle type where both the fuel and the oil are fed together into the crankcase.

The crankshaft 15 may be mounted in a bearing 16 in the cylinder block and includes a crank pin 17 to which the connecting rod 14 is connected through the bearing assembly 10 of the invention.

The bearing assembly 10 includes a plurality of cylindrical rollers or needles 20 which are separated from each other and guided by a bearing cage 21, as shown particularly in FIGS. 3 to 5, and which embodies the present invention. Preferably the bearing cake 21 if of the split type and includes two generally semiannular portions 22 and 23, one of which is shown in FIG. 4. Each of the two bearing cage portions is provided with swo spaced semiannular flanges 24 and 25. The two flanges 24 and 25 are interconnected by a plurality of axially extending bars 26 which are preferagly integral with their flanges 24 and 25. Thus a roller is spaced between each pair of bars 26 and rests on the two flanges 24 and 25. It should be noted that the bars 26 extend inwardly of the flanges 24 and 25, as clearly shown in FIG. 4. Accordingly the rollers 20 are disposed radially inwardly of the flanges 24 and 25.

In accordance with the present invention and for a purpose to be more fully explained hereinafter, the entire outer faces of tre flanges, such as 25, are relieved as shown at 27. The outer faces of the flanges 25 may be tapered as shown in FIG. 5, the taper beginning at the junction of the flange 25 with the bars 26; that is, at the line 28. The angle of the taper preferably is very small and may be of the order of 2° to 4°. Similarly, at least a portion of the inner faces of the flanges 24 and 25 is relieved, as shown at 30. In other words, these are the inner facing or opposed faces of the two flanges, such as 24 and 25. Again the relief shown at 30 may be a straight taper having an angle of the order of 2° to 4°. Also, preferably, the taper extends to a line 31 which is approximately midway between the bars 26 and the outer end of the flange 25.

It will be noted that the inner ends of the bars 26 are also tapered or beveled, as shown at 32. In addition the outer faces of the flanges adjacent their junctions with the other pair of flanges are tapered as clearly shown at 33 particularly, in FIG. 4.

Instead of tapering the outer and inner faces of the flanges as at 27 and 30 to provide a chamfer, it is also feasible to provide the set-in reliefs illustrated in FIG. 6, which is a modified construction of the bearing cage of the invention. Thus, the outer faces of the flanges, such as 25, are provided with a set-in relief illustrated at 35, beginning at the line 28, which is the junction between the flanges such as 25 and the bars 26. The inner faces are similarly provided with a set-in relief 36 beginning at the line 31 halfway between the outer end of the flanges and their junction with the bars 36. The set-in reliefs 35 and 36 have the advantage that they can be machined and do not have to be ground. It is also possible in this manner to hold the starting points of the reliefs to much closer tolerances. It will be noted that the outer relief 35 is straight so that this surface can be used as a support for a broaching operation. However, the inner set-in relief may be beveled or slanted as illustrated.

Conventional split cage bearing assemblies when used in the manner illustrated in FIGS. 1 and 2, were found to fail after a service life of the order of fifty hours or less. Inspection of the failed cages showed broken cage bars and flanges. It is believed that this was due to a large side thrust which develops between the face of the connecting rod 14, the flanges of the cage, and the crank pin 17. This side thrust acts against the four flat and substantially uninterrupted faces of straight flanges, such as 24 and 25 of a conventional bearing cage. Oil was permitted to circulate between the outer and inner faces of the flanges and the associated thrust faces only at the split of the two portions of the bearing cage. As a result the oil breaks down, the flanges overheat, which of course causes further breakdown of the oil, and eventually seizure and breakage of the bearing cage.

As the thrust load increases the flanges act as brakes on the bearing needles 20, which obviously travel in a different pitch circle and at a different relative speed than the flanges, due to their different radii. As a result the needles were pulling and the flanges retarding, which in turn caused the bars 26 of the cage to deflect. This deflection is in a direction which causes skew forces to act on the needles, which in turn further increases the side thrust exerted by the connecting rod.

Thus failure of conventional bearing cages may be attributed to the lack of lubrication or the breakdown of the oil on the one hand and the difference in the moment arms of the rollers 20 and flanges 24 and 25.

These drawbacks of conventional bearing cages are obviated by the bearing cage of the invention and specifically by the chamfers or reliefs, such as 27, 30 or 35, 36. Thus the taper 27 or set-in relief 35 on the outer faces of the flanges extends to the line 28 corresponding to the end of the bars 26. Accordingly only the outer ends of the bars 26 support the thrust load. In addition this arrangement allows free lubrication of each thrust pad.

On the other hand the taper 30 or set-in relief 36 on the inner faces of the flanges has two purposes. One purpose is to allow more oil to reach the outer faces of the connecting rod. The second purpose is to reduce the moment arm created at the inner face of the flanges such as 25 by the thrust of the connecting rod having greater diameter than the ends of the bar which transmit the thrust to the crankshaft.

To further increase the lubrication the faces 40 of the connecting rod 14 as shown particularly in FIG. 2 are provided with a plurality of circumferentially spaced shallow depressions of calotte-like shape. Thus these depressions 41 facilitate the circulation of the oil between the thrust faces 40 of the connecting rod 14 and the inner relief 25 or 36 of the flanges.

This arrangement obviously reduces friction between the flanges of the cages and the connecting rod faces so that overheating is much reduced, which in turn also reduces skewing loads well below the failure point of the bearing. Thus, after 370 hours of service, no failures have been found of the bearing cages of the present invention.

The tapered faces 33 facing each of the bearing portions 22 and 23 also increase the circulation of oil between the bearing assembly and the adjacent thrust members.

Preferably the entire bearing cage is made integral and consists of metal. Accordingly the bars 26 and flanges 25 are made of one piece. Preferably the bearing cage is made of a carburized steel which may subsequently be case hardened. The cage is eventually electrosilver plated with a layer having a thickness between ½ and 1 mil and thereafter heat treated.

There has thus been disclosed an improved bearing cage which permits better lubrication between the adjacent thrust faces and the bearing flanges, which reduces overheating and vastly increases the service life of the bearing.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:

1. A bearing cage for separating and guiding cylindrical rollers, comprising:
    (A) two annular flanges spaced apart from each other;
    (B) a plurality of axially extending cage bars spaced apart to receive a cylindrical roller between each pair, resting on said annular flanges;
    (C) the entire outer faces of said flanges being relieved; and
    (D) at least a portion of the inner faces of said flanges being likewise relieved, whereby, when said flanges are disposed between spaced apart parallel members, any lateral thrust is taken up by said bars, and oil is permitted to circulate between the outer and inner faces of said flanges and the members.

2. A bearing cage for separating and guiding cylindrical rollers, comprising:
    (A) two pairs of spaced apart semi-annular flanges forming together two spaced apart annular flanges;
    (B) a plurality of axially and inwardly extending cage bars spaced apart to receive a cylindrical roller between each pair resting on said annular flanges;
    (C) the entire outer faces of said flanges being relieved; and
    (D) at least a portion of the inner faces of said flanges being likewise relieved, whereby, when said flanges are disposed between spaced apart parallel members, any lateral thrust is taken up by said bars and oil is permitted to circulate between the outer and inner faces of said flanges and the members.

3. A bearing cage for separating and guiding cylindrical rollers, comprising:
    (A) two annular flanges spaced apart from each other;
    (B) a plurality of axially and inwardly extending cage bars integral with said flanges and spaced apart to receive a cylindrical roller between each pair resting on said annular flanges;
    (C) the entire outer faces of said flanges being relieved; and
    (D) at least a portion of the inner faces of said flanges being likewise relieved, whereby, when said flanges are disposed between spaced apart parallel members, any lateral thrust is taken up by said bars and oil is permitted to circulate between the outer and inner faces of said flanges and the members.

4. A split bearing cage for separating and guiding cylindrical rollers, comprising:
    (A) two pairs of spaced apart semi-annular flanges forming together two spaced apart annular flanges;
    (B) a plurality of axially and inwardly extending cage bars integral with an associate pair of flanges and spaced apart to receive a roller between each pair of bars and the associated semi-annular flanges;

(C) the entire outer faces of said flanges being relieved up to their junction with said bars;

(D) at least a portion of the inner facing faces of said flanges being likewise relieved; and (E) the outer faces of each pair of flanges adjacent their junction with the other pair of flanges being tapered along their junction, whereby, when the outer and inner faces of said flanges are disposed between parallel members, the outer faces of said bars will take up lateral thrust while the outer and inner faces of said flanges and said tapered flanges permit oil to circulate between said flanges and the members.

5. A split bearing cage for separating and guiding cylindrical rollers, comprising:

(A) two pairs of spaced apart semi-annular flanges forming together two spaced apart annular flanges;

(B) a plurality of axially and inwardly extending cage bars integral with an associate pair of flanges and spaced apart to receive a roller between each pair of bars and the associated semi-annular flanges;

(C) the entire outer faces of said flanges being relieved up to their junction with said bars;

(D) at least a portion of the inner facing faces of said flanges being likewise relieved;

(E) the outer faces of each pair of flanges adjacent their junction with the other pair of flanges being tapered along their junction; and (F) the outer portion of the outer faces of said bars being tapered, whereby, when the outer and inner faces of said flanges are disposed between parallel members, the outer faces of said bars will take up lateral thrust while the outer and inner faces of said flanges and said tapered flanges permit oil to circulate between said flanges and the members.

6. A bearing cage for separating and guiding cylindrical rollers, comprising:

(A) two annular flanges spaced apart from each other, (B) a plurality of axially extending cage bars spaced apart to receive a cylindrical roller between each pair resting on said annular flanges;

(C) the entire outer faces of said flanges being relieved;

(D) at least a portion of the inner faces of said flanges being likewise relieved;

(E) a pair of outer thrust members bearing against the outer faces of said cage;

(F) a pair of inner thrust members bearing against the inner faces of said flanges; and (G) a plurality of depressions on the surface of said inner thrust members to permit oil to circulate between said inner faces of said flanges and said inner thrust members.

7. A split bearing cage for separating and guiding cylindrical rollers, comprising:

(A) two pairs of spaced apart semi-annular flanges forming together two spaced apart annular flanges;

(B) a plurality of axially and inwardly extending cage bars integral with an associate pair of flanges and spaced apart to receive a roller between each pair of bars and the associated semi-annular flanges;

(C) the entire outer faces of said flanges being relieved up to their junction with said bars;

(D) at least a portion of the inner facing faces of said flanges being likewise relieved;

(E) a pair of outer thrust members bearing against the outer faces of said cage;

(F) a pair of inner thrust members bearing against the inner faces of said flanges; and (G) a plurality of depressions in the surface of said inner thrust members to permit the circulation of oil between said inner faces of said flanges and said inner thrust members.

References Cited by the Examiner

UNITED STATES PATENTS 2,696,411  12/1954  Kircher _____ 308—35

MARTIN P. SCHWADRON, *Primary Examiner.*

F. SUSKO, *Assistant Examiner.*